(12) United States Patent  
Caulkins

(10) Patent No.: US 8,239,640 B2  
(45) Date of Patent: Aug. 7, 2012

(54) SYSTEM FOR CONTROLLING PERFORMANCE ASPECTS OF A DATA STORAGE AND ACCESS ROUTINE

(75) Inventor: Jason Caulkins, West Windsor, NJ (US)

(73) Assignee: Dataram, Inc., West Windsor, NJ (US)

( * ) Notice: Subject to any disclaimer, the term of this patent is extended or adjusted under 35 U.S.C. 154(b) by 712 days.

(21) Appl. No.: 12/248,479

(22) Filed: Oct. 9, 2008

(65) Prior Publication Data

US 2010/0095073 A1    Apr. 15, 2010

(51) Int. Cl.  
*G06F 12/08* (2006.01)

(52) U.S. Cl. .................. 711/154; 711/170; 711/E12.019

(58) Field of Classification Search .................. 711/154, 711/170, E12.019  
See application file for complete search history.

(56) References Cited

U.S. PATENT DOCUMENTS

| | | | | |
|---|---|---|---|---|
| 6,845,344 | B1* | 1/2005 | Lally et al. | 702/186 |
| 7,792,923 | B2* | 9/2010 | Kim | 709/218 |
| 2002/0083221 | A1* | 6/2002 | Tsai et al. | 710/1 |
| 2003/0172239 | A1* | 9/2003 | Swank | 711/163 |
| 2005/0038958 | A1* | 2/2005 | Jadon et al. | 711/114 |
| 2005/0278501 | A1* | 12/2005 | Taguchi | 711/203 |
| 2005/0283580 | A1* | 12/2005 | Lewis | 711/165 |
| 2006/0100842 | A1* | 5/2006 | Dominguez et al. | 703/20 |
| 2006/0184740 | A1* | 8/2006 | Ishikawa et al. | 711/129 |
| 2006/0288159 | A1* | 12/2006 | Haruna et al. | 711/113 |
| 2007/0028053 | A1* | 2/2007 | Shet et al. | 711/129 |
| 2008/0104591 | A1* | 5/2008 | McCrory et al. | 718/1 |
| 2008/0195834 | A1* | 8/2008 | Gill et al. | 711/171 |
| 2008/0229020 | A1* | 9/2008 | Plamondon | 711/122 |
| 2009/0164492 | A1* | 6/2009 | Cotichini et al. | 707/101 |
| 2011/0145806 | A1* | 6/2011 | Cook | 717/170 |

* cited by examiner

*Primary Examiner* — Charles Rones  
*Assistant Examiner* — Hal Schnee  
(74) *Attorney, Agent, or Firm* — Donald R. Boys; Central Coast Patent Agency, Inc.

(57) ABSTRACT

A system for controlling one or more aspects of a data storage and access routine incorporates a filter driver residing on a digital storage medium internal to or accessible to a host computing system; and a configuration interface residing on the digital storage medium. The interface enables reservation of an amount of memory for accelerating processes of data access and data storage and wherein the filter driver monitors data read and data write requests and processes those requests allowed through configuration and according to configured parameters.

19 Claims, 6 Drawing Sheets

SYSTEM FOR CONTROLLING PERFORMANCE ASPECTS OF A DATA STORAGE AND ACCESS ROUTINE

CROSS-REFERENCE TO RELATED APPLICATIONS

NA

BACKGROUND OF THE INVENTION

1. Field of the Invention

The present invention is in the field of computing and pertains particularly to methods and apparatus for controlling data storage and access performance of a computing system.

2. Discussion of the State of the Art

In the field of computing, data storage and access remains one of the most important areas of new research. Data storage capacities for single data storage devices are now classed in the terabyte range instead of the gigabyte range.

In a typical computing system, random access memory (RAM) is provided for main memory of the system. Main memory is where a computing system stores application data, program data, and other important data frequently accessed by the central processing unit (CPU). A smaller amount of RAM is typically available to the CPU of a computer system and is used for data caching. CPU speeds have increased much more so than the speeds at which external data can be stored and accessed.

Mechanical storage disks such as magnetic or optical disks require a read/write head and are slower than more recently developed non-volatile flash-based storage devices. However, reading from and writing to solid state storage disks while faster than mechanical disks is still slower than operating RAM following its true random access characteristic.

While the storage capacity of individual data storage disks have dramatically increased, system developers have not increased cache capacities of computing systems to maintain acceptable or normal ratios of cache available to storage capacity available for a given computing system. The much smaller ratio of cache to available storage capacity may lend to a cache hit ratio or hit rate that is significantly lower when compared to systems with more cache in proportion with storage capacity. Main memory is relatively more expensive to add to a computing system than extra storage space so the tradeoff of more storage capacity but reduced caching capability persists for more robust computing systems.

What is needed then to solve such disparities is a system for enabling control of the performance aspects of a data storage and access routine in a computing system relative to use of existing RAM space and dedicated storage space. Such a system will enable performance enhancement for computing system data storage and access speeds without requiring expensive additions of main memory to the system.

SUMMARY OF THE INVENTION

The problem stated above is that faster data storage and access speeds are desirable for a computing system, but many of the conventional means for storing and for accessing data, such as mechanical disk systems, also create latency. As data storage capacity for robust systems increases cache available to the system has not increased in proportion. The inventors therefore considered functional elements of a computing data storage and access system, looking for elements could add to memory caching capacity that could potentially be harnessed to provide a larger and more efficient caching system but in a manner that would not add significantly more cost to the system.

Every data storage and access system is driven by a data storage controller accessible to a computing platform and connected by cable to one or more hard disk drives a by product of such architecture is performance lag in writing and reading data especially when the hard disks are mechanical disks. Most such data storage and access systems employ data storage controllers to manage data storage and data access routines relative to application requests from the running applications of the computing system. Mechanical hard disk drive systems are largely still part of such data storage and access systems.

The present inventor realized in an inventive moment that if, at the point of requests, more data could be cached in non-mechanical memory structure, significant performance acceleration might result. The inventor therefore constructed a unique control system for boosting the performance of a data storage and access routine that allowed hot data or frequently accessed data to be cached in a combination of fast RAM buffer and a non-volatile solid state drive during a computing session in a manner that minimized the necessity for accessing the data directly from disk storage. A significant performance increase results, with no impediment processing stability created.

Accordingly, in one embodiment of the invention a system for controlling one or more aspects of a data storage and access routine is provided comprising a filter driver residing on a digital storage medium internal to or accessible to a host computing system, and a configuration interface residing on the digital storage medium. The configuration interface enables reservation of an amount of memory for accelerating processes of data access and data storage and wherein the filter driver monitors data read and data write requests and processes those requests allowed through configuration and according to configured parameters.

In one embodiment the filter driver is installed in the driver layer of an operating system logically represents a data storage controller when in use. In one embodiment the data storage controller is a multichannel controller providing computing access to one or more hard disk storage systems of multiple hard disk drives, one or more solid state disk storage systems of multiple solid state storage disk drives, or one or more data storage systems combining both solid state disk and hard disk drives.

In one embodiment the system further includes a solid state storage system accessible to the host computing system through a peripheral component interconnects board. In a variation of this embodiment the solid state storage system includes multiple solid state storage devices.

In a preferred embodiment the filter driver has access to the communication path between the disk controller and the solid state storage system. In one embodiment of the system the memory amount reserved is Random Access Memory for the purpose of expanding cache. In another embodiment the memory amount reserved solid state memory for the purpose of expanding cache. In still another embodiment the memory amount reserved includes system RAM and additional solid state memory, the solid state memory reserved for additional data storage capacity.

In one embodiment the memory reserved as expanded cache is dedicated to a specific one or multiples of logical disks the mechanism of dedication by local block address identification of blocks on those disks. In one embodiment the disk-based storage system is a redundant array of independent disks. In one embodiment the memory amount reserved for expanded solid state storage space is assignable to one or more of connected data storage systems as additional disk drive storage space. In one embodiment the host computing system is an application server connected to a storage area network providing access to at least one redundant array of independent disks connected to the network.

In one embodiment the controller is a PCI Fibre Channel controller and the data transmitting protocol is Fibre Channel protocol.

In one embodiment the configuration interface enables visibility of each logical disk of the data storage system and enables pre-selection of one or more logical disks for expanded cache memory reservation, expanded storage memory reservation or a combination of both. In one embodiment expanded cache memory reservation can be made from an amount of system main or an amount of solid state memory or some combination of both.

In one embodiment the memory reserved as expanded cache is dedicated to a specific one or ones of server applications or a mix of server applications and wherein the mechanism of dedication is by trigger identification of applications requesting services. In another embodiment memory reservation of main memory and solid state storage is dynamic occurring as the result of a trigger event defined by rule through the configuration interface. In one embodiment an amount of RAM and an amount of solid state memory is reserved for use in an organized parallel cache.

BRIEF DESCRIPTION OF THE DRAWING FIGURES

DETAILED DESCRIPTION

The present inventor provides a unique system that enables a user or a system operating a data storage and access system through a computer host to monitor and control how access to data storage elements including mechanical and/or solid state disks for read and for write are managed through configurations made to the system. The system and methods of the present invention are described in various embodiments below.

Figure 1:
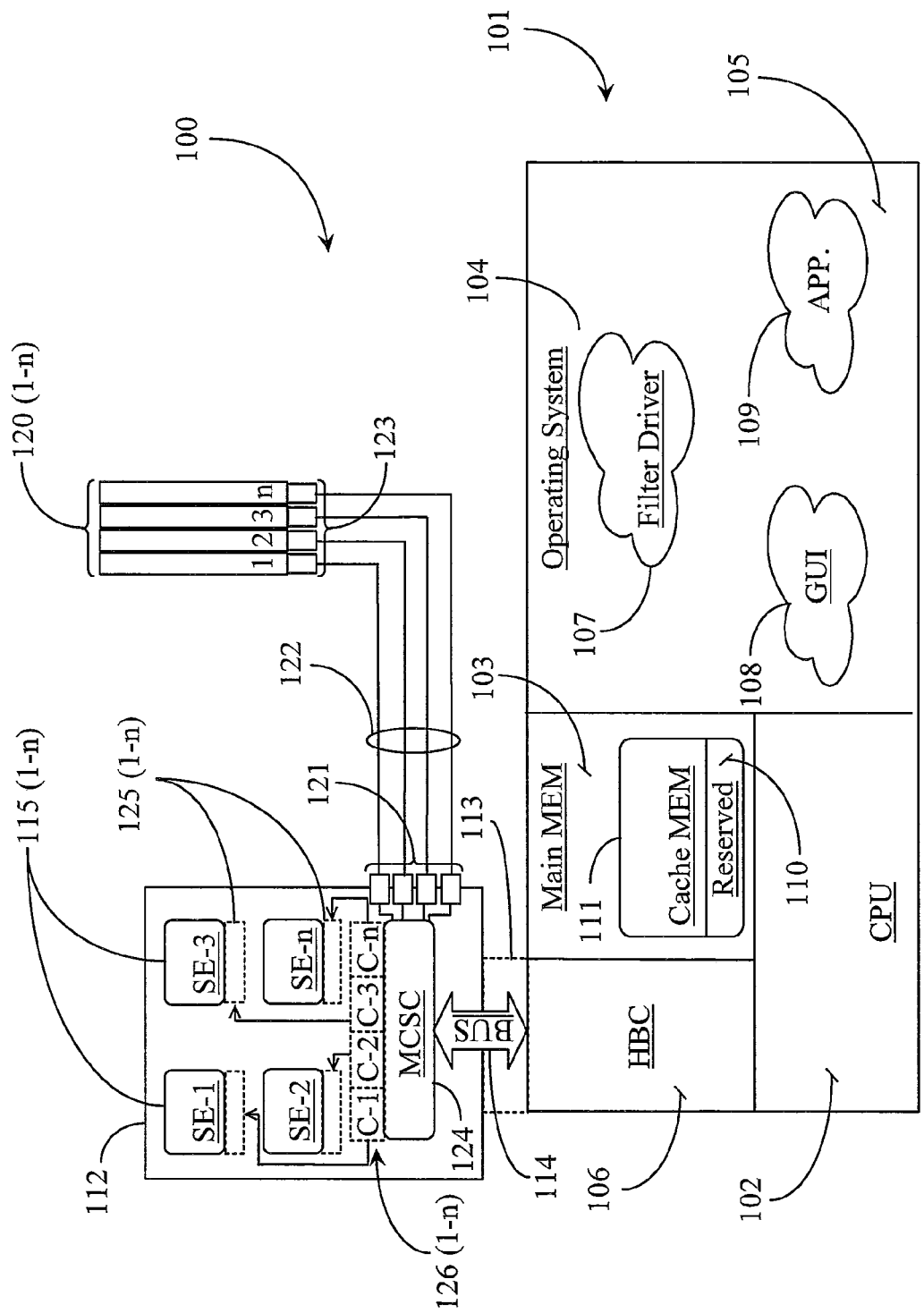
FIG. 1 is a block diagram illustrating components of a data storage and access control system integrated in a computing architecture according to an embodiment of the present invention.

FIG. 1 is a block diagram illustrating components of a data storage and access control system integrated in a computing architecture 100 according to an embodiment of the present invention. Computing architecture 100 is a simple logical example of a data storage and access system accessible through a host computing system. A host computing system 101 is logically illustrated in this example. System 101 may be a desktop type computing system, a mobile computing system such as a wireless Laptop, or system 101 may be an application server or other dedicated personal or enterprise computing appliance.

Computing system 101 includes a central processing unit (CPU) 102 which may be mounted to a motherboard of the system. System 101 has a main system memory 103 that is typically mounted on the motherboard of the system and is accessible to CPU 102 via local BUS. Main memory 103 is a Random Access Memory and may include a mix of dynamic RAM (DRAM) chips and a smaller amount of Static RAM (SRAM) chips. Main memory can have several parts or portions that perform different tasks.

A part of main memory 103 is cache memory 111. Cache memory 111 may be a mix of DRAM and SRAM and is used to cache data instructions program data and storage data. A small portion or piece 110 of cache memory 111 is provided as dedicated memory for performing certain computing tasks. Cache memory 111 is otherwise flexible relative to assignment and may include more than one level of cache memory such as a level 1 cache memory, level 2 cache memory and level 3 cache memory depending on the system. In this example the main memory is illustrated as being physically separate from CPU 102, however in more recent computing systems smaller amounts of RAM, typically SRAM are provided directly on the CPU instead of on the motherboard board and bussed to the CPU. For the purpose of discussion memory directly on the CPU is faster than memory bussed to the CPU because of bus contentions and limitations.

Host system 101 includes host bus controller (HBC) 106 adapted to enable CPU 102 to talk to a peripheral bus illustrated herein a bus 114. HBC 106 is provided on the system motherboard in this example. In this embodiment, computing architecture 100 includes a storage card 112 that is adapted to connect to host system 101 such as through a peripheral component interconnect (PCI) slot. It is important to note herein that the architecture illustrated here is logical only as there may be multiple card slots and adaptors as well as multiple peripheral data storage systems or devices connected to the host through cards or other mechanisms such as direct ports.

In this example card 112 is a PCI card connected to host system 101 via a PCI connector 113 utilizing an available PCI slot on host system 101. Storage card 112 communicates with host system 101 over peripheral PCI bus 114. In this example a multichannel storage controller (MCSC) 124 is provided on storage card 112 and is adapted to enable host computer access to a connected data storage system illustrated herein as a compilation of data storage disks 120 (1-$n$). Disks 120 (1-$n$) may be hard disks aggregated as a redundant array of independent disks (RAID) or solid state disks aggregated as a RAID system, or any combination thereof.

Connectors 121 are illustrated in this example and are adapted to connect data cables 122 to storage card 112, more particularly to MCSC 124. At the other end of cabling 122, connectors 123 are provided to connect each disk 120 (1-$n$) to host system 101 for storage and access. One with skill in the art will appreciate that disks 120 (1-$n$) may be optical, mechanical, magnetic, solid state or other disk types. Disks 120 (1-$n$) may observe any type of advanced technology attachment (ATA) protocol such as parallel advanced technology attachment (PATA), or serial advanced technology attachment (SATA) or SCSI without departing from the spirit and scope of the present invention.

In one embodiment disks 120 (1-$n$) comprise a remote array of storage disks connected to a storage area network (SAN) accessible to the ghost over a local area network (LAN) or a wide area network (WAN). In such a case other standards might be observed such as SCSI over Fibre Channel Protocol (FCP) over Internet Protocol (IP), or SCSI over Transfer Control Protocol over Internet Protocol (TCP/IP), ATA over Ethernet, and so on. In still another embodiment, disks 120 (1-*n*) may be a network attached storage (NAS) system. In this case, file system terminology is used to access data rather than a data block system. The present invention may be adapted for local, SAN and NAS storage systems without departing from the spirit and scope of the present invention.

MCSC 124 has direct access (by bus or onboard integration) to multiple storage element controllers 126 (1-*n*) mounted on PCI card 112. Controllers 126 (1-*n*) also illustrated herein as C-1, C-2, C-3, and C-n, are bussed on card 112 directly to a same number of connectors 125 (1-*n*) mounted on the card and adapted to connect to solid state storage elements 115 (1-*n*). Solid state storage elements 115 (1-*n*), also illustrated herein as SE-1, SE-2, SE-3, and SE-n, are storage memory modules that are plugged onto PCI card 112. Storage elements or devices 115 (1-*n*) are flash-based storage devices in one embodiment. Storage elements 115 (1-*n*) are provided on PCI card 112 in one embodiment for the purpose of adding extra storage capacity to the data storage system defined by disks 120 (1-*n*). In one embodiment storage elements 115 (1-*n*) may be configured as expanded cache memory for the data storage system defined by disks 120 (1-*n*).

Host 101 has an operating system 104 that supports data processing applications such as application 109. Application 109 frequently requests to read data from and to write data to the storage system exemplified by disks 120 (1-*n*). There are other applications known to the inventor may also be operating simultaneously with application 109 and may be actively reading from and writing to storage system 120 (1-*n*).

According to an embodiment of the present invention, a filter driver 107 is provided as part of the operating system 101, the driver is integrated with the OS driver stack or layer. Driver 107 may be configured by a user operating a graphic user interface (GUI) 108 provided as an executable application supported by the operating system.

GUI 108 may be invoked by a user to provide an initial monitor-based display and one or more subsequent displays of information and interactive options for configuring the functional aspects of the filter driver among other available tasks. Filter driver 107 is adapted to look at (monitor) disk traffic (Disk I/O) between applications (109) and MCSC 124. Filter driver 107 is capable of reserving and operating an amount of memory in system RAM from host system 101 and in solid state memory 115(1-*n*) on card 112 as an expanded parallel data caching system to improve the efficiency and speed of data storage and access operations performed by applications 109 operating on the host system. Filter driver 107 may also reserve and maintain a portion of solid state memory 115 (1-*n*) as a stand alone disk presented to the operating system as an additional disk drive.

In operation of the system, filter driver 107 actively monitors disk I/O traffic (read and write requests) that normally are handled by the multichannel storage controller and the static caching system already in place without added reservation of memory. Filter driver 107 intercepts the requests and attempts to service those requests using the expanded parallel cache system reserved for the purpose so that the data storage system hard disks are accessed as infrequently as possible during a computing session. The driver checks local block addresses (LBAs) against a metadata look-up table (not illustrated) to determine if data for read, for example, is in the expanded system in either reserved RAM buffer in main memory 103 or in solid state cache on card 112. The optimization involves serving data requested for read by the host system directly from reserved RAM buffer on the host or from solid state cache on card 112.

Data write requests are monitored to see if the LBA for write is in RAM buffer or solid state cache or both. The system attempts to cache hot data or most frequently accessed data and discards least recently used (LRU) data. The system enables acceleration of performance for the entire data storage and access system, particularly one that uses mechanical disks as main storage. The system and can be implemented in and can be effective in several different computing architectures. More detail of cache operation of reserved memory by the filter driver will be provided later in this specification.

Figure 2:
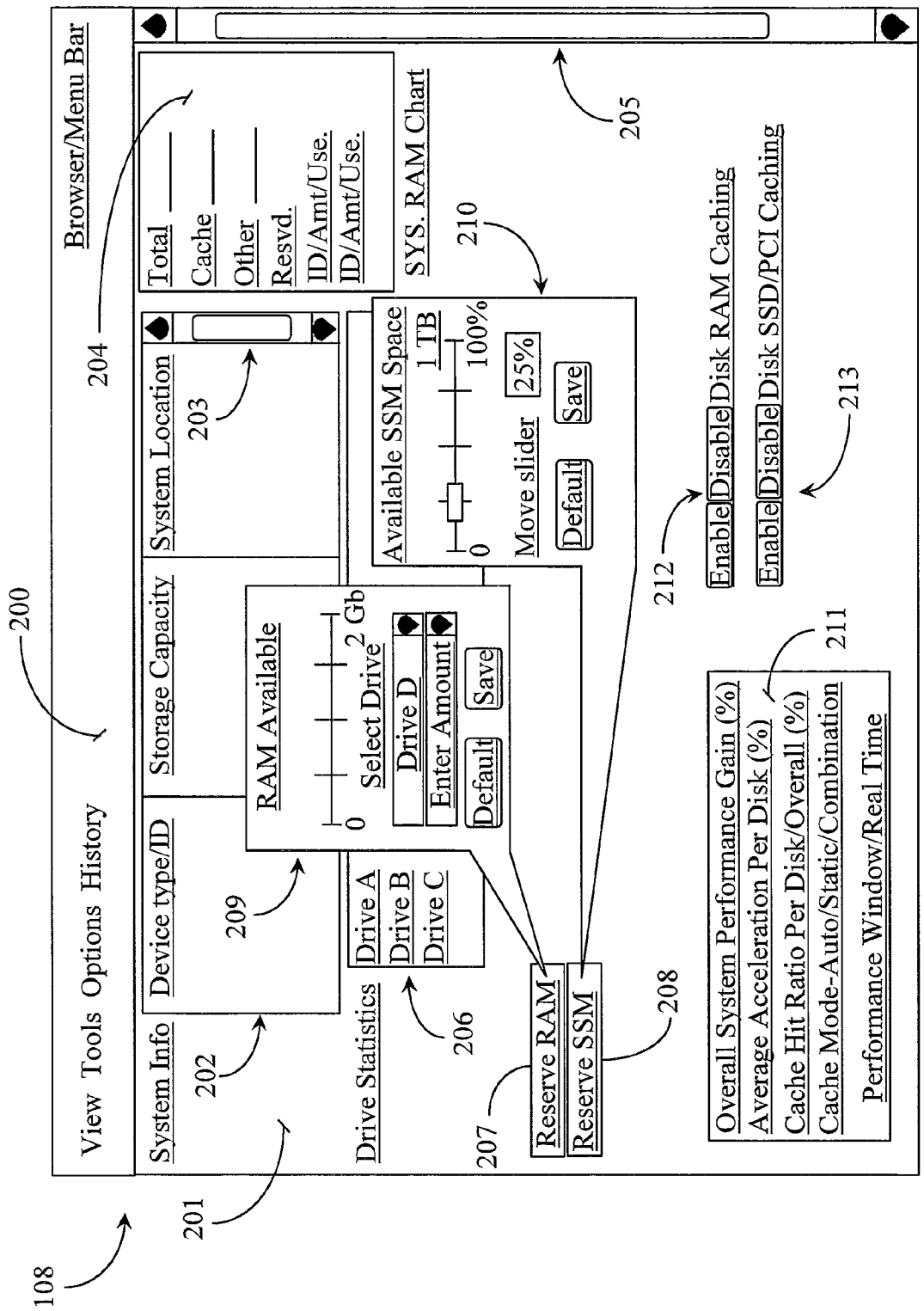
FIG. 2 is an exemplary screen shot of a graphics user interface display resulting from execution of the GUI of FIG. 1.

FIG. 2 is an exemplary screen shot of a graphics user interface 108 of FIG. 1 according to an embodiment of the present invention. GUI 108 is illustrated in this example as in display of an initial information and configuration window. GUI display 108 may be a standalone interactive screen or window 201. Window 201 may be scrollable via a scroll bar 205. Window 201 may be browser-based or nested and the GUI may be accessible through a browser tool bar option. GUI main window 201 may have a browser/menu title bar 200 that may include standard pull down menus such as a view menu a tools menu, an options menu, and a history menu. If the application is browser-based other browser options and menus would be included notwithstanding search interfaces, an address navigation interface, and so on.

When GUI 108 is invoked for the first time on a computing system, the underlying SW component referred to in this application broadly as a filter driver may work with other OS drivers to gather system information for display to the user operating the interface. Part of system information may be displayed in a system information window 202 illustrated in this example. Information window 202 may display separately or within main window 201 and is adapted to display active storage devices or drives accessible to the host operating system.

Window 202 is presented in a row and column format for listing devices and device attributes. Reading from left to right in the window, a first column identifies device type and device identification (ID). Typically a logical ID such as a drive letter will be presented to the system although some other ID parameters may also be displayed such as serial numbers or the like. A next column may be presented that identifies at least the total storage capacity of the device identified in the first column. The amount of storage that is free or not being used may also be listed. System location may also be listed for each accessible storage device. System location may be a system address, a drive letter, a network address for a storage device connected to a data storage network, etc. Window 202 may be a scrollable window enabled by a scroll bar 203.

Another piece of system information may be a general rundown of system main memory or RAM. A system RAM chart 204 is illustrated and is adapted to contain information about main memory often referred to as system RAM. In this example, a total amount of system RAM is listed followed by an amount of RAM allocated for cache and an amount set aside for other purposes. Some of the total amount of system RAM may be reserved for specified uses according to a preferred embodiment of the present invention such reservation possible through GUI 108.

In system RAM chart 204, which gives the RAM breakdown, the last two items in the list describe such reservations made. A RAM ID, a reserved amount of the RAM, and use identification for the reserved amount of memory are displayed as separated values in each line. In this case there are two reservations of system RAM made. One or both reservations may be for expanded instruction or data caching or some other dedicated use.

GUI 108 has an interactive option 207 for reserving RAM for dedicated use as reserved cache. Invoking option 207 may result in display of a configuration control window 209. In one embodiment RAM from system main memory may be reserved as fast cache or a dedicated RAM buffer for a specific logical drive. In control window 209 a RAM slider is presented that displays a total amount of available RAM from 0 to the total amount along a scale. A drop down menu containing data storage drive letters is provided for a user to select a drive "to accelerate" a second drop down menu enables the user to enter an amount of RAM to be reserved for data caching involving drive D in this case. An option for saving the configuration is provided as well as an option for selecting a default amount recommended by the system.

A default or suggested amount of RAM to reserve for a disk drive might be deduced by the system after detecting all of the current information relative systems data storage and access architecture. An interactive option may also be provided within window 209 for specifying an exact use for the reserved RAM. In one embodiment a user may elect an amount of RAM to reserve for performance acceleration and the system may decide the specific hierarchy and partition if any for buffer operation types. In one embodiment, system RAM reserved is dedicated as a RAM buffer that is used to cache most used data and has a replacement policy based on least recently used (LRU) data. In one embodiment, reserved system RAM is used in conjunction with an external reservation of solid state memory in a parallel caching organization of memory dedicated to the purpose of maximizing cache hit ratio and minimizing actual reads and writes to the external storage system.

In one embodiment the system includes provision of solid state memory for the purpose of enabling the option of providing solid state based caching and/or additional storage space that can be assigned to an existing drive the operating system "sees" or which can be set aside as a standalone SSD. In one embodiment the solid state memory is flash based nonvolatile memory (NVMEM) installed on a peripheral component interconnect (PCI) card connectable to the host system motherboard through an available PCI slot and pin connector. In this case an interactive option 208 for reserving solid state memory may be provided for reservation of the solid state memory (SSM) on the PCI card.

Invoking option 208 may result in the display of a subsequent configuration window 210. Window 210 presents available SSM space in this case on a scale from 0 to 100% with a total amount available specified as 1 terabyte (TB) for illustrative purpose only. A user may move a slider to determine how much of the available memory to set aside. There may be other controls and entry fields adapted to enable the user to specify the parameters of each reservation of SSM. For example, a drop down menu may be provided to allow the user to select a dedicated use for a particular reservation such as for PCI cache (PCI card based MEM), extra SSD storage, or a standalone SSD. A reserved amount of SSM may be used for expanded cache memory dedicated to one or more disk drives the memory associated in a parallel caching method to a reserved amount of RAM for the same drive or drives.

In one embodiment solid state memory on a PCI card may be assigned a drive letter as a SSD and an amount of RAM from main memory may be reserved as a RAM buffer for the new disk. In addition or in place of a slider, window 210 may contain a field for entering an amount of SSM and may include the options of classifying the reserved amount as expanded cache memory or as extra storage space (logical disk). Different amounts of SSM can be reserved in a scenario where a combination of expanded cache and additional disk storage is reserved for one or more logical drives.

Other interactive options may be provided in GUI 108 such as an enable/disable toggle switch 212 for enabling and disabling disk RAM caching and an enable/disable toggle switch 213 for enabling or disabling SSD and PCI caching. The system of the invention including the configurable driver and PCI memory enhancement is adapted to work best with any computing system that accesses slower hard disk drives (HDDs) like mechanical drive systems. However this should not be considered a limitation as the system may also provide performance increases for computing systems that access external cabled or networked solid state disks for data storage.

In one embodiment of the invention a performance window 211 is provided to display within or separately from main window 201. Performance window is adapted to present real-time information or statistics about the performance of the system. Various types of performance data may be monitored for display such as the overall performance gain of the system over typical performance averages without enhancement through the present invention. The system of the invention may be enabled to calculate the average acceleration per logical disk if more than one logical disk is being "accelerated" from the perspective of the CPU of the host system. Data in window 211 may include cache hit ratio per logical disk and for the system overall. The system of the invention may include modes for cache operation such as automatic caching, static caching or a combination and may indicate which mode the system is operating in. Other statistics might also be provided by the system such as accelerated performance statistics over time.

One with skill in the art of GUI interface design will appreciate that there are many different presentation options and display modes that can be provided for GUI 108 without departing from the spirit and scope of the invention. In a very simple form the configuration GUI is Limited to presetting the RAM buffering and SSM caching/storage for a logical disk drive of a computing system and reporting performance increases to the user after the system is activated. In a more robust embodiment the system may be used to accelerate multiple logical disk drives available to a computing system and may provide active performance monitoring and reporting of a wide array of system variables. In one embodiment of the present invention, a single version of GUI 108 may be used on an administrative computing terminal to preset multiple servers that have access to one or more data storage systems. A copy of the filter driver may be installed on each of the computing servers and SSM may be installed via PCI or other standard on each of the servers as well.

In a very simple embodiment the system can be installed to a computing system without provision of added SS memory where reservation of system memory (RAM) is all that is practiced for accelerating one or more HDDs connected to the computing system. In a preferred application additional SS memory is added via PCI card or other standard so that additional optimizations in system performance can be effected.

Figure 3:
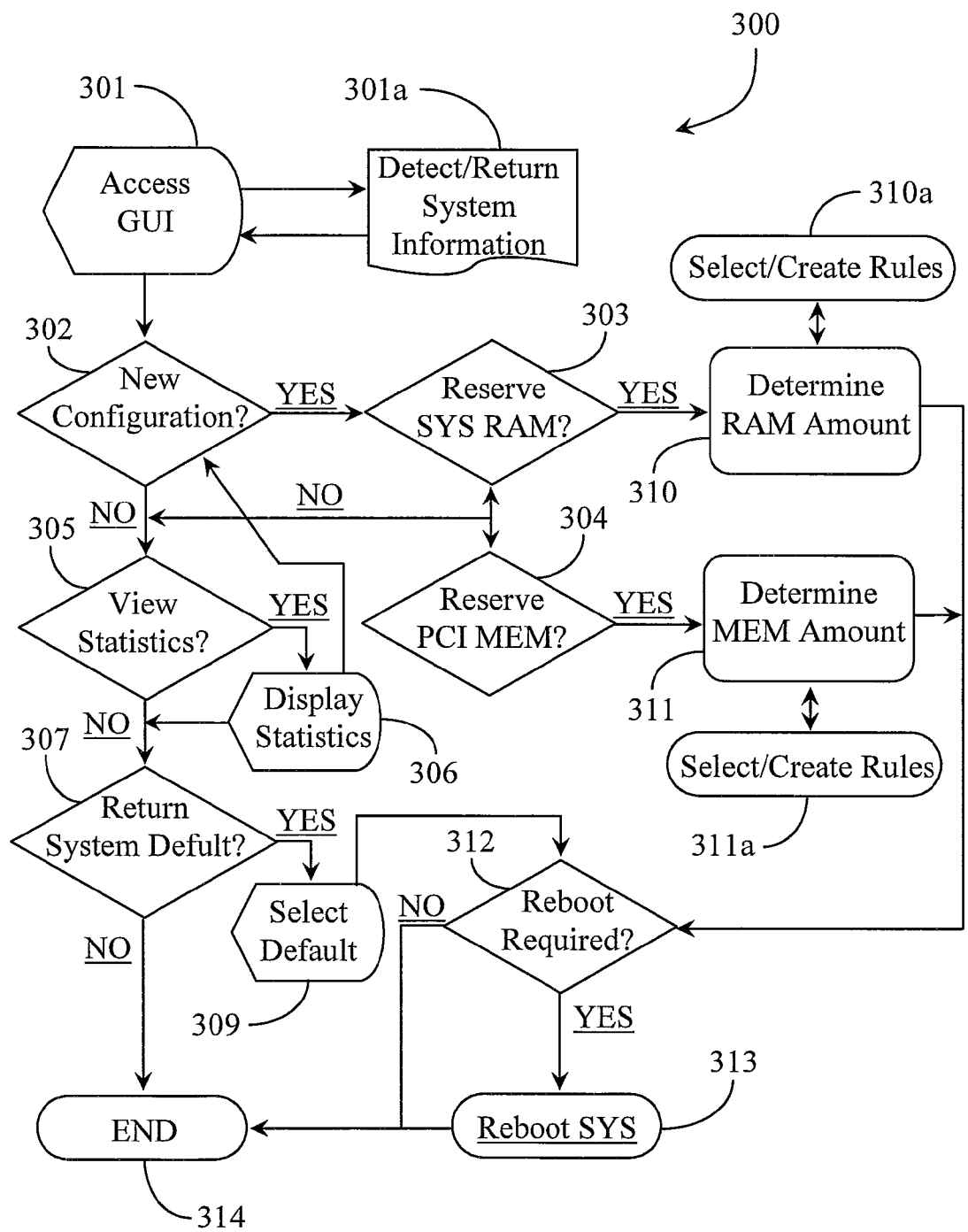
FIG. 3 is a process flow chart illustrating steps for configuring aspects of a data access and storage routine according to an embodiment of the present invention.

FIG. 3 is a process flow chart illustrating steps 300 for configuring aspects of a data access and storage routine according to an embodiment of the present invention. At step 301 a user accesses a GUI analogous to GUI 108 of FIG. 1. Such access may be the result of invocation of a link to the executable program stored on the computing system or a link to execution of the GUI accessible from within a browser toolbar for example. The filter driver controlled by GUI may gather current system information at step 301 so that all of the most pertinent and current data may be observed in the interface before configuration changes are initiated. If a new storage system is added for example, the filter driver being part of the operating system, will immediately recognize the added drive.

At step 302 it is decided whether there will be a new configuration or in the case of first run an initial configuration. All of the previous configuration settings are available in the case of a subsequent configuration change or modification. If it is decided a new configuration will be initiated then at step 303 the user makes a decision whether or not to reserve an amount of system (SYS RAM). System RAM is main memory that can be reserved for dedicated use such as for a RAM data buffer. If the user decides not to reserve any system RAM at step 303 the option for reserving solid state memory is available. At step 304 the user decides whether to reserve solid state memory, which may be in the form of PCI memory. PCI memory can be reserved for caching, data storage, or a combination of the two. If at step 304 the user has decided not to reserve PCI MEM after deciding against reserving RAM at step 303 the option for viewing statistics at step 305 is still available to the user.

If at step 305 the user decides to view statistics then at step 306 statistics may be displayed as a result of user selection of an interactive option button. After reviewing statistics at step 306 the user may again decide if a new configuration is warranted at step 302. If the user determined not to view statistics or after viewing statistics determined no new configuration would be launched then an option for applying or returning to system defaults is available. The user may determine at step 307 to set system defaults. System defaults may be the recommended RAM and PCI MEM settings based on what information was previously gathered by the filter driver of the system after it was installed and activated to gather system information. A system default setting recommendation might change after the system has run for some period of time and statistical data is gathered by the system. New system recommendations may be suggested by the system and may be considered the current default settings if accepted by a user.

If at step 307 the user decides to set system default settings then at step 309 the user may select "default" launching a return to whatever default settings are recognized. Changing the settings to default settings might require a rebooting of the computing system in order for the changes to be made. The system decides at step 312 whether the system requires a reboot. If the system does not require a reboot the process ends at step 314. If the system does require a reboot in order for default settings to take effect then the user may reboot the system at step 313 and the process may then terminate at step 314.

At step 307 if the user decides not to return the system to default settings the process may terminate at step 314 with the user exiting the GUI. In one embodiment the system is already set to default settings and the user has decided not to initiate any changes. In that case the process may terminate without steps 307, 309, 312 and 313.

Referring now to step 303 in the process the user may decide to reserve an amount of RAM for use as a RAM buffer. At step 310 the user determines the amount of RAM to be reserved. Step 310 may include one or more steps 310a for selecting and/or creating rules for application of the reserved RAM. Such rules may include which drives the RAM should be used for and which type of buffer (instruction, data, page translation,) the RAM is to be used for. A rule may be created to set a trigger event or time window within which to activate or deactivate the created RAM buffer.

Referring now to step 304 in the process the user may decide to reserve an amount of PCI MEM for use as an expanded cache or as added disk storage. At step 311 the user determines an amount of PCI MEM to reserve. Step 311 may include one or more steps 311a for selecting and or creating rules governing application of the reserved PCI MEM. The solid state memory available for reservation may be provided in forms other than PCI card-based memory. The inventor chooses PCI card-based memory because of its convenience and access performance characteristics. In this aspect the PCI card known to the inventor but not generally to the public supports the multichannel storage controller (MCSC 124) that controls access to both the existing storage system and the added solid state memory plugged into the card. In one embodiment the PCI MCSC replaces any pre-existing storage controller connected to the host system.

Steps 310 and 311 may be executed independently of one another, for example, reservation of system RAM does not depend on reservation of SS MEM nor does SS MEM reservation depend on reserving RAM. However, in one embodiment it is optimal to reserve both for use in a parallel caching system that uses both system RAM and PCI MEM to optimize the performance speed of reading and writing data for the computing system. The exact order of execution of steps 310 and 311 may be reversed from that illustrated. The process moves directly to step 312 after determining amounts of RAM and PCI MEM to reserve and after completion of auxiliary configurations with steps 310a and 311a. At step 312 the system decides if a reboot is required. If a reboot is required then at step 313 the user may reboot the system in order for the configuration settings to take effect. If the system does not require rebooting at step 312 then the process may terminate at step 313 and the user may exit the GUI. A step may be added after each configuration option for loading and saving the setting.

One with skill in the art of process will appreciate that there may be more or fewer steps included in process 300 without departing from the spirit and scope of the invention. Likewise, sub-routines may be provided at various intervals in the overall process for configuring details such as which drives configuration settings apply to and other like details.

Figure 4:
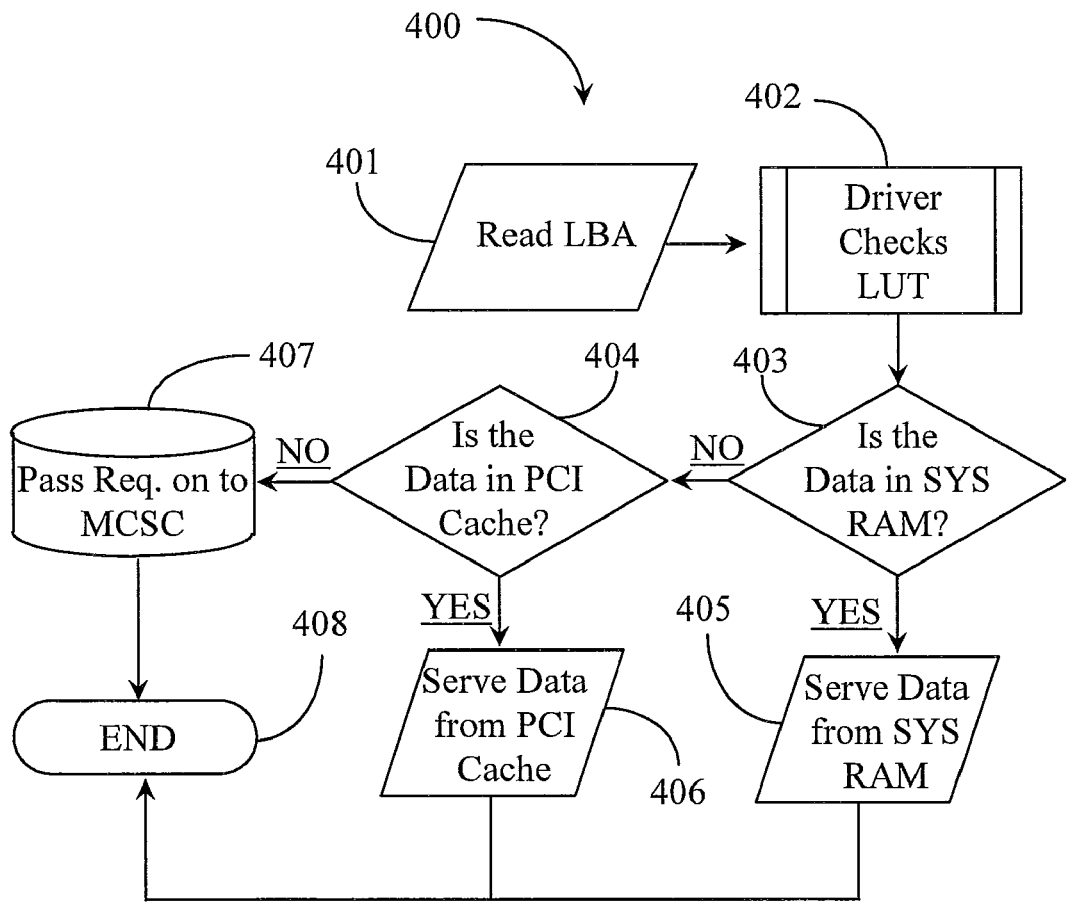
FIG. 4 is a process flow chart illustrating steps for accelerating a read operation according to an embodiment of the present invention.

FIG. 4 is a process flow chart illustrating steps 400 for accelerating a read operation according to an embodiment of the present invention. In a configuration where both RAM and PCI MEM are reserved for caching purposes, the system optimizes performance by avoiding actual access of the data storage disk system. The filter driver has access to a special table referred to as a lookup table (LUT) that tracks memory locations for read and write requests.

At step 401 a read request for a local block address (LBA) comes into the filter driver of the system. The filter driver and its traffic redirection (caching) operations are transparent to the operating system and to the running applications. At step 402 the driver checks a look up table (LUT). An example of a LUT that might be used is presented below.

|       | RAM | CACHE |
|-------|-----|-------|
| LBA 0 | 1   | 0     |
| LBA 1 | 0   | 0     |

| | RAM | CACHE |
|---|---|---|
| . | | |
| . | | |
| LBA n | 1 | 1 |

1 = valid data;
0 = no valid data

For every read then the driver checks a LUT at step 402 for the LBA requested for read. At step 403 the driver determines if there is valid data in SYS RAM for that LBA. Valid data is indicated by a value 1 next to the address. If there is a 1 next to the LBA in the LUT then the data for read is in the RAM buffer and at step 405 the filter driver serves or causes the data to be served from the reserved RAM buffer. Given the data for read is in RAM at step 403 and served from RAM at step 405 the process can end for that request at step 409. The process always starts with an LUT check to see if data is in RAM because system RAM is faster that PCI MEM.

If there is a 0 next to the LBA in the system RAM column at step 403 it means there is no valid data in RAM for that LBA. At step 404 the system continuing to check the table determines if there is valid data in the PCI cache column in the LUT table for that LBA. If there is valid data in the PCI cache there will be a 1 next to the LBA in the cache column in the LUT. If there is valid data in cache then at step 406 the driver serves or causes to be served from PCI cache. If the data is in both locations 1, 1 for the LBA then the data will be swerved from RAM because it is faster.

If at step 404 there is a 0 in the PCI cache column for that LBA in the LUT then the filter driver hands the request off to the multichannel storage controller at step 407 as if the request was never intercepted transparently to the operating system and applications. A 0, 0 entry in the LUT for an LBA indicates that the data is not valid in either reserved RAM or reserved PCI MEM location. In this case the data might only be read from disk unless another system, perhaps the generic cache system has cached the data. In the event of a cache miss where valid data for the requested LBA is not found the request is passed on to the storage controller. In one embodiment the system uses reserved system RAM to create a RAM buffer that does not override or replace existing RAM already in use for caching instructions and data. In another embodiment the RAM reservation overrides any existing RAM caching architecture in place accept for static RAM dedicated for specific purposes which cannot be reconfigured.

PCI memory is added to the system and therefore was not previously available to the system however such additional memory configured as PCI cache for example may replace any virtual memory or swap space in place on the disk system or it may simply be used in addition to what is already available. It is noted herein that the system is applicable to drives (logical disks) and in the event of more than one drive, one may be accelerated using the system of the invention while another may not, relying on existing caching schemes and memory.

Figure 5:
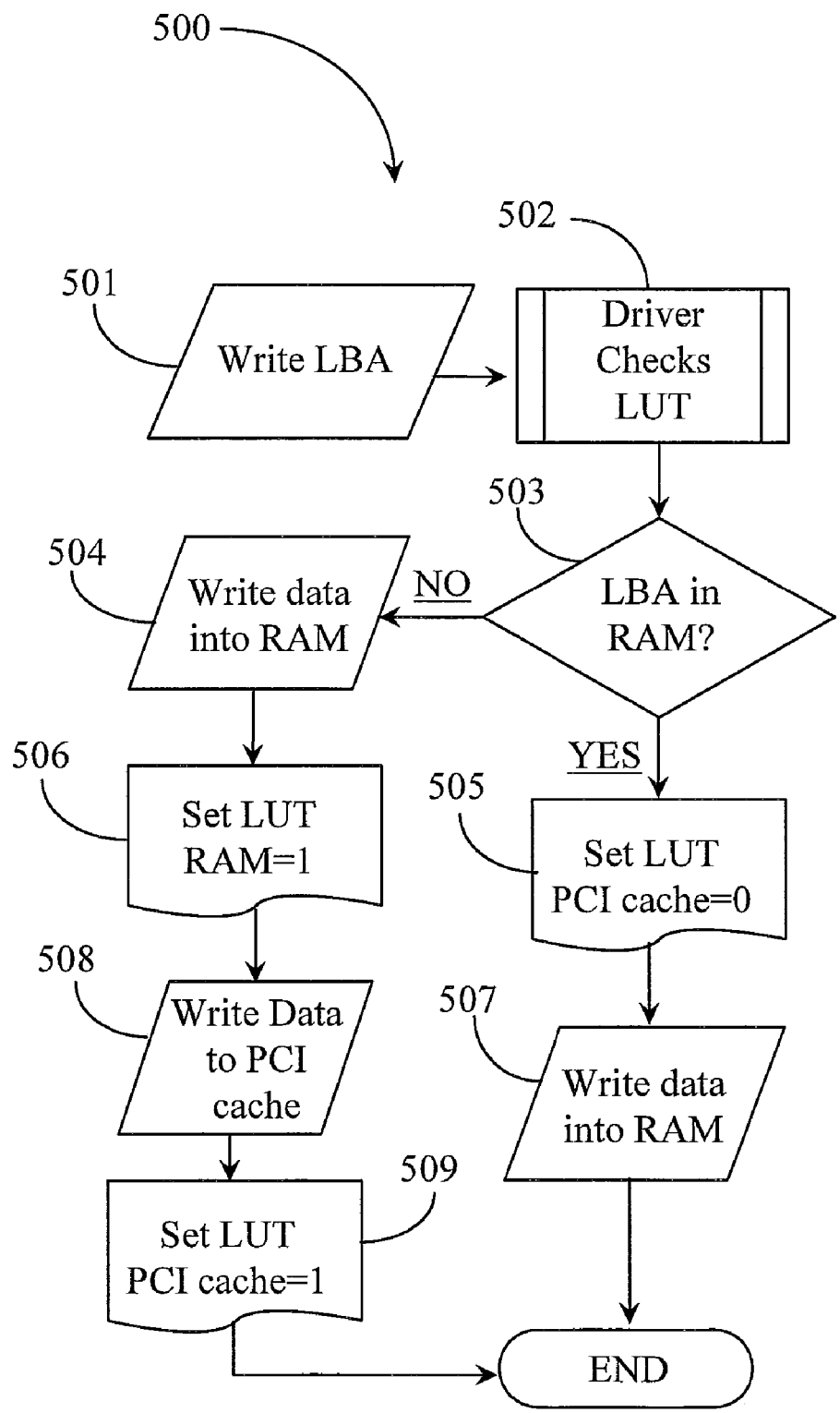
FIG. 5 is a process flow chart illustrating steps for accelerating a write operation according to an embodiment of the present invention.

FIG. 5 is a process flow chart illustrating steps for accelerating a write operation according to an embodiment of the present invention. At step 501 a request for write to an LBA arrives at the filter driver. At step 502 the filter driver checks the LUT. At step 503 if the LBA is in RAM (being tracked), the filter driver sets the PCI cache line for that LBA to 0 because of the impending write. At step 507 the filter driver writes the data or causes the data to be written directly to RAM. The process ends for that write request.

If At step 503 the LBA is not in RAM at step 504 the filter driver writes the data or causes the data to be written into RAM. At step 506 the filter driver sets the LUT to 1 for the LBA indicating that there is now valid data in RAM for the LBA.

At step 508 the filter driver also writes the data or causes the data to be written into PCI cache. At step 509 the filter driver sets the LUT for PCI cache at that LBA to 1 indicating that valid data is also in PCI cache for that LBA. The process then ends for that write request. It is important to note herein that by writing the system RAM buffer and into PCI cache, the LBA may be dropped from the fast cache buffer according to LRU policy but the data is still available in the PCI cache and can be served from there on a read request.

Figure 6:
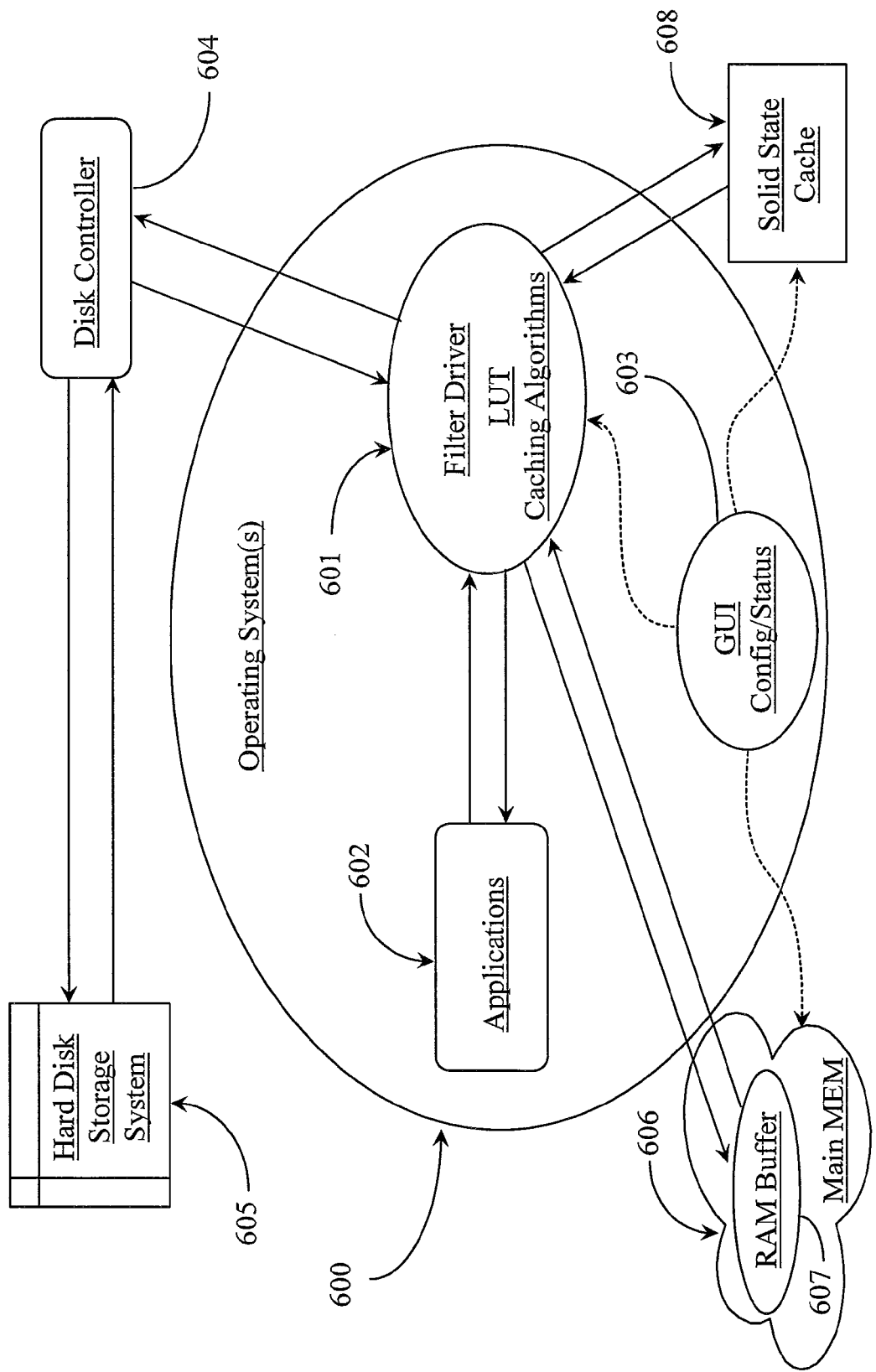
FIG. 6 is a logical block diagram illustrating relationships between new and existing components in a computing architecture using the system of the present invention.

FIG. 6 is a logical block diagram illustrating relationships between new and existing components in a computing architecture according to an embodiment of the present invention. An operating system environment 600 of a host computing system hosts a filter driver 601 including a look up table (LUT) caching algorithms. Filter driver 601 is analogous to driver 107 described with respect to FIG. 1. Filter driver 601 is logically presented in the communication path between a disk controller 604, connected by cable to a hard disk storage system 605, and the rest of the system on the computing side. In this example a RAM buffer 607 is reserved from main system memory 606 by a GUI 603 analogous to GUT 108 of FIG. 1. A solid state cache 608 is also reserved for use by the system.

GUI 603 is used to configure filter driver 601 including reservation of amounts of RAM 607 and cache 608. In one embodiment, such configurations are made through the filter driver after the driver is installed in the operating system driver stack and is functional. In one embodiment the GUI may be operated to access main memory and installed PCI memory independently of the filter driver installation. Disk traffic between applications 602 and controller 604 is monitored on behalf of storage system 605, which may present to the operating system as a single logical drive or more than one drive. The filter driver may in some cases be adapted to handle more than one storage system such as two separate logical drives having separate disk controller. Cache and RAM buffer reservation may be accomplished for each logical drive given available memory.

In one embodiment GUI 603 is able to access and make use of system diagnostic capabilities such as disk defragmenters, graphics accelerators, system recovery tools, file checking systems and so on independently of filter driver configuration tools. In some embodiments GUI 603 may provide added security measures for drives and cached data.

In one embodiment of the present invention an option for configuring dynamic cache reservation changes may be provided based on some trigger scenario such as the number and identification of specific applications running and simultaneously reading and writing to the storage system. For example, if the system recognizes more than a specified number of applications running or if the system recognizes a certain mix of running applications, extra RAM and/or PCI cache might be added to the system by the filter driver dynamically according to a user preset rule and then removed after a less memory dependant situation resumes.

It will be apparent to one with skill in the art that the data storage and access control system of the invention may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. A system for controlling one or more aspects of a data storage and access routine comprising:
   a filter driver residing on a digital storage medium internal to or accessible to a host computing system; and
   a graphic user interface (GUI) executing from software residing on the digital storage medium for displaying active storage devices and drives accessible to the host operating system, real-time information regarding the host computing system and for configuring the filter driver;
   characterized in that the GUI enables a user to manually configure the system by at least configuring the filter driver to reserve an amount of memory as an expanded cache for accelerating processes of data access and data storage and wherein the filter driver monitors data read and data write requests and processes those requests allowed through the configuration and according to the configured parameters and the GUI displays a calculated acceleration of the drives and storage devices as a result of the memory reservation for the expanded cache.

2. The system of claim 1 wherein the filter driver is installed in the driver layer of an operating system and logically represents a data storage controller when in use.

3. The system of claim 2 wherein the data storage controller is a multichannel controller providing computing access to logical disks including at least one or more hard disk storage systems of multiple hard disk drives, one or more solid state disk storage systems of multiple solid state storage disk drives, or one or more data storage systems combining both solid state disk and hard disk drives.

4. The system of claim 3 further including a solid state storage system accessible to the host computing system through a peripheral component interconnects board.

5. The system of claim 4 wherein the solid state storage system includes multiple solid state storage devices.

6. The system of claim 4 wherein the filter driver has access to a communication path between the disk controller and the solid state storage system.

7. The system of claim 1 wherein the amount of memory reserved is Random Access Memory for the purpose of expanding cache.

8. The system of claim 4 wherein the amount of memory reserved is solid state memory for the purpose of expanding cache.

9. The system of claim 4 wherein the amount of memory reserved includes system RAM and solid state memory, the solid state memory reserved for additional data storage capacity.

10. The system of claim 4 wherein the amount of memory reserved as expanded cache is dedicated to a specific one or multiple ones of the logical disks, the mechanism of dedication is by local block address identification of blocks on those disks.

11. The system of claim 3 wherein the one or more hard disk storage systems is a redundant array of independent disks.

12. The system of claim 4 wherein the amount of memory reserved for the expanded cache is assignable to one or more connected data storage systems as additional disk drive storage space.

13. The system of claim 2 wherein the host computing system is an application server connected to a storage area network providing access to at least one redundant array of independent disks connected to the network.

14. The system of claim 13 wherein the controller is a PCI Fibre Channel controller a data transmitting protocol of the controller is a Fibre Channel protocol.

15. The system of claim 3 wherein the GUI enables visibility of each logical disk of the data storage system and enables pre-selection of one or more logical disks for expanded cache memory reservation, expanded storage memory reservation or a combination of both.

16. The system of claim 4 wherein expanded cache memory reservation can be made by reserving an amount of system main memory or an amount of solid state memory or some combination of both.

17. The system of claim 4 wherein the amount of memory reserved as expanded cache is dedicated to specific one or ones of server applications or a mix of server applications and wherein the mechanism of dedication is by trigger identification of applications requesting services.

18. The system of claim 16 wherein the amount of main memory and solid state storage is dynamic occurring as the result of a trigger event defined by a rule through the GUI.

19. The system of claim 4 wherein an amount of RAM and an amount of solid state memory is reserved for use in an organized parallel cache.

* * * * *